Dec. 29, 1936. C. E. REED 2,065,741
CUTTER SPINDLE AND ANTIFRICTION BEARING ASSEMBLY
Filed March 5, 1935
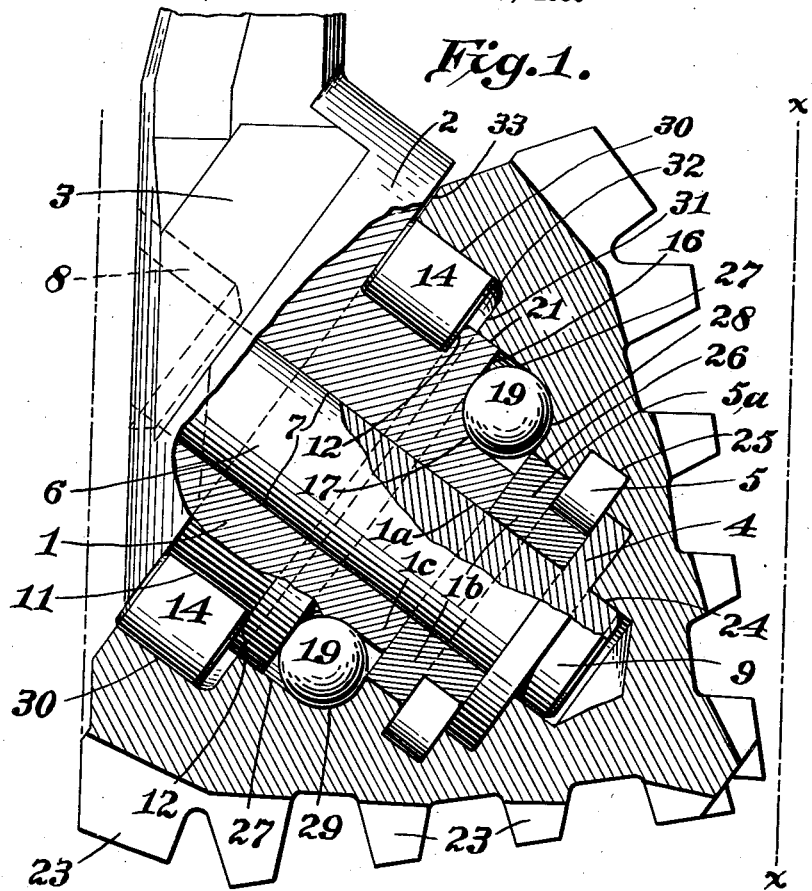
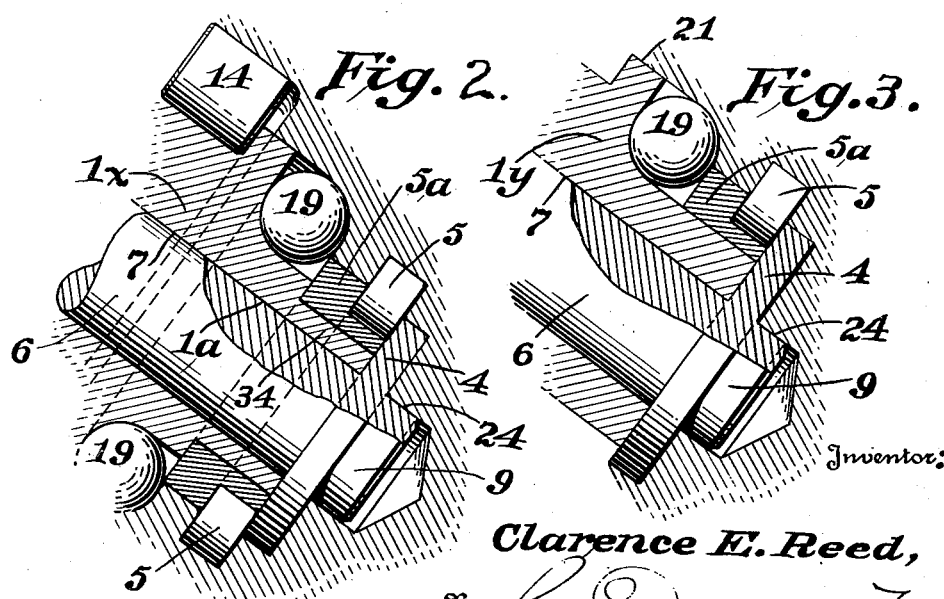
Inventor:
Clarence E. Reed, Patented Dec. 29, 1936

2,065,741

UNITED STATES PATENT OFFICE 2,065,741

CUTTER SPINDLE AND ANTIFRICTION BEARING ASSEMBLY

Clarence E. Reed, Wichita, Kans., assignor to Chicago Pneumatic Tool Company, New York, N. Y., a corporation of New Jersey Application March 5, 1935, Serial No. 9,496

16 Claims. (Cl. 255—71)

This invention concerns a roller cutter and spindle assembly for earth boring drills, one object being to provide an arrangement of anti-friction bearings for taking the various thrusts to which the cutter is subjected in performing its work.

In the accompanying drawing

Figure 1 shows the assembly in longitudinal section with parts in elevation.

Figs. 2 and 3 show modifications of the L-shaped ring in its relation to the other elements.

In this drawing 1 indicates a main spindle member projecting downwardly and inwardly towards the vertical axis of the drill which axis is indicated by the dotted line x—x. This spindle projects from a support 2, to which said spindle is fixed. Preferably these parts are formed in one piece. The spindle support has a suitable shank or stem, a part of which is shown at 3, extending substantially vertically or substantially parallel with the vertical axis of the drill for mounting in the drill head in any suitable way either by welding or by mechanical means as in my prior applications or patents.

A supplemental spindle section is associated with the main spindle section and includes a terminal portion made up of an annular flange 4, and a stem portion 6 which is coaxial with the axis of the main spindle section and extends through the central opening 7 of said main spindle section, these parts being held in their proper relation to each other by welding at 8. Mounted on the stem 6 between the flange 4 and the end face 1a of the main section of the spindle, is a circular member 1b, right angular in cross section, presenting a portion of a runway between the flange 5a of said member and the flange 4, in which runway are rollers or discs 5 for locking the roller cutting rotatively on the spindle. The supplemental spindle section further includes a cylindrical free end 9 of reduced diameter in respect to the flange 4, said cylindrical free end being coaxial with the stem 6 and the main section of the spindle. The main spindle section has an annular groove, the bottom 11 of which presents a cylindrical surface concentric with the axis of the spindle and the wall 12 defining one side of said groove is of annular form lying in a plane at right angles to the axis of the spindle and the other side of which groove is formed by the annular wall or face 13 of the spindle support 2, which face lies in a plane parallel with the plane of the opposite wall 12.

This annular groove has mounted therein a row of anti-friction rollers 14 of cylindrical form whose parallel end faces lie adjacent the opposing walls defining the sides of the groove. These rollers rotate upon the cylindrical surface at the bottom of the groove. The main spindle section has a reduced diameter free end 1c of cylindrical shape, projecting from a shoulder 16 which is of annular form and lies in a plane extending at right angles to the axis of the spindle, there being an annular bearing area 17 between the face of the shoulder and the reduced diameter cylindrical part of the main spindle section, which bearing area is curved in cross section to conform to the curved surface of ball bearings 19. These balls are adapted to run on said annular bearing area. The main spindle section also has a cylindrical surface 21 lying between the shoulder 16 and the wall 12 of the groove in which the anti-friction rollers 14 work, this cylindrical surface affording a friction bearing for the roller cutter. The roller cutter is of general frusto-conical form. It has teeth 22 spaced apart in circumferential rows (or these teeth may be in a spiral row) upon its apex portion, and it has a base portion at an inclination to the conical apex zone upon which base portion teeth are cut as at 23, these latter teeth causing a twisting or a scraping action to be imparted to the cutter, instead of a true rolling action. The cutter has its apex portion embracing the free end of the spindle and it has a bore of such form as to receive the spindle and anti-friction bearing assembly. For this purpose it has at the extreme inner end of its bore, that is at the end of the bore nearest the apex, a cylindrical bore of reduced diameter to frictionally engage the reduced diameter terminal extension 9 of the terminal section of the spindle. Next to this reduced diameter bore the cutter has a bore of larger diameter than the terminal bore, the wall of which larger diameter bore is shown at 24 having frictional engagement with the periphery of the flange 4 on the terminal section of the spindle. Next in order there is a groove 25 complementary to the portion of the raceway for the locking rollers formed between the side wall of the flange 4 and the side face of the flange 5a of the circular member 1b. This groove in the cutter has parallel side walls to fit the sides of the locking rollers or discs 5 and it has a cylindrical bottom wall which bears upon the peripheries of the locking rollers. Next in order the cutter has a cylindrical wall portion 26 to frictionally contact with the cylindrical periphery of the flange 5a of the circular member 1b. Next in order, the cutter has a further enlargement of its bore to provide for the reception of the comparatively large ball bearings 19.

This enlarged bore is made up of a cylindrical wall portion 27 concentric with the spindle axis and having friction bearing upon the largest diameter cylindrical portion of the spindle at 21 and said bore is defined further by a wall 28 which is parallel to the plane in which the spindle shoulder 16 lies and there is an annular bearing area 29 curved in cross section to fit the curve of the ball, this curved bearing area lying intermediate the concentric wall 27 and the wall 28 of the enlarged bore. On this annular bearing area of the cutter the balls roll. The shoulder 16 of the spindle and the wall 28 of the cutter bore are, as above stated, parallel with each other and they lie in planes tangential to the balls 19 and they extend respectively to the concentric wall of the cutter bore and to the reduced diameter portion of the main section of the spindle, so that the ball at no point contacts with edges of a joint, and is not subjected to shearing stresses but is under only compressive stresses.

This contributes to the life of these ball bearings because there are no edges or joints over which the balls must roll in contact with said edges.

The bore of the cutter at its base portion is further enlarged presenting a cylindrical wall 30 which contacts with the peripheries of the cylindrical rollers 14. This enlarge base bore is defined at its front side by a wall 31 lying in a plane at right angles to the axis of the cutter. This wall 31 is out of line with the wall 12 of the spindle so that a free space 32 lies adjacent the forward end face of the anti-friction roller 14 so that the cutter is in non-end-thrust relation to the inner end of the cylindrical roller 14, and therefore has no tendency to skew the roller out of its axial parallelism with the axis of the cutter and the spindle. This enlarged bore at the base of the cutter is open at the base face 33 of said cutter and this open bore has the face or shoulder 13 of the spindle support extending across it to close the same and confine the roller bearings 14 in said open bore.

In the construction above described the main working loads are taken by the roller bearings 14 within the open bore of the base of the cutter and partly by the comparatively large balls 19. The roller bearings 14 are not subjected to end thrust, but this end thrust is taken largely by the ball bearings 19, and end thrust of the cutter is also taken by the face of the flange 4. The locking roller bearings 5 take some of the operating end thrust of the cutter, but usually they additionally sustain only some of the radial load imposed on the cutter. Their main function is to lock the cutter rotatively on the spindle. The cutter is maintained coaxial with the spindle, also by the friction bearings distributed along the spindle assembly consisting of the cylindrical surface of the reduced terminal extension 9, the periphery of the flange 4, the cylindrical surface of the flange of the circular member, and also the cylindrical surface of the spindle lying between the ball bearings and the roller bearings 14 and the maintenance of the coaxial relation between the cutter and the spindle contributes to the proper functioning of the anti-friction and locking bearings and the proper rotation of the cutter about the spindle and anti-friction bearing assembly.

In assembling the roller cutter and its spindle and bearing organization the terminal section of the spindle first is inserted in the cutter into the position shown; the locking rollers or discs are next placed in the groove of the wall of the cutter bore; the circular member is then placed on the stem of the terminal spindle sections into the position shown to complete the raceway for the locking rollers, and thereafter the main spindle section and the main ball and roller bearings are assembled on the stem of the supplemental spindle section and within the cutter. The circular member may be threaded on the stem of the terminal spindle section.

In Fig. 2, the spindle 1x is of slightly modified form from that shown in Fig. 1, this modification consisting in providing the spindle with a reduced diameter end portion 34 upon which portion the ring 5a is seated with its side face bearing against the shoulder 1a of the spindle.

In Fig. 3 a further modification is shown in which the spindle 1y is extended so as to underlie the ring 5a.

I claim:

1. A roller cutter and spindle assembly for earth boring drills comprising a spindle and its support, a roller cutter, anti-friction bearing in the form of cylindrical rollers between the cutter the spindle and the support, said spindle having a main section provided with a shoulder intermediate of its length and with a reduced diameter cylindrical portion projecting from said shoulder, ball bearings at the junction of said shoulder and said reduced diameter cylindrical portion of the spindle and upon which balls the roller cutter bears, a terminal spindle section having a flange and a stem fitting in the main section, a circular member positioned on the stem of the terminal section of the spindle, said circular member having a portion of a raceway between the same and the flange of the terminal spindle section and anti-friction means in said raceway portion and in a complementary raceway portion of the cutter for locking the cutter rotatively on the spindle, substantially as described.

2. A roller cutter and spindle assembly for earth boring drills comprising a spindle and its support, said spindle having adjacent its support an annular groove providing a raceway portion for anti-friction bearings, and having intermediate of its length a shoulder lying in a plane substantially at right angles to the spindle axis and with a reduced diameter cylindrical portion of said spindle projecting from said shoulder, the surface of said shoulder and the surface of said reduced diameter portion of the spindle having between them an annular bearing surface curved in cross section to conform to the curved surface of ball bearings rolling on said bearing surface, a cutter mounted on said anti-friction bearings, and means associated with the end portion of the cutter bore including a ring and interfitting parts rotatively locking said cutter on the anti-friction bearings.

3. A roller cutter and spindle assembly for earth boring drills according to claim 2 in which the cutter has a bore to receive the said balls, said bore being defined by a cylindrical wall concentric with the axis of the spindle, an annular front wall lying in a plane at right angles to the axis of the spindle and parallel with the plane in which the face of said shoulder lies, said concentric wall and front wall of the cutter bore having between them an annular bearing surface curved in cross-section to conform to the surface of the ball and upon which surface the ball rolls, said annular bearing surface on the spindle and in the cutter lying at opposite sides of the ball in relation to each other.

4. A roller cutter and spindle assembly for earth boring drills according to claim 2 in which the cutter has a bore to receive the said balls, said bore being defined by a cylindrical wall concentric with the axis of the spindle, an annular front wall lying in a plane at right angles to the axis of the spindle and parallel with the plane in which the face of said shoulder lies, said concentric wall and front wall of the cutter bore having between them an annular bearing surface curved in cross section to conform to the surface of the ball and upon which surface the ball rolls, said annular bearing surfaces on the spindle and in the cutter lying at opposite sides of the ball in relation to each other, the wall of the cutter bore in which the balls are located having a friction bearing upon a portion of said spindle located between the balls and the base of the cutter, and the free end portion of the spindle carrying a member having a friction bearing receiving a portion of the wall of the cutter bore located between said balls and retaining means positioned in the apex of the cutter.

5. A roller cutter of substantially frusto-conical form for earth boring drills, having a bore within its base portion, a smaller bore adjacent the bore first mentioned and defined by a wall concentric with the axis of the cutter and an annular front wall lying in a plane at right angles to the cutter axis connected with said concentric wall by an annular bearing surface concavely curved in cross-section and a still smaller bore having a groove therein, substantially as described.

6. A roller cutter assembly for an earth boring drill comprising a spindle having intermediate of its length a shoulder, the surface of which lies in a plane at right angles to the spindle axis and a reduced diameter cylindrical portion projecting from said shoulder coaxially with the axis of the spindle, said shoulder and reduced diameter portion being connected by an annular bearing area concavely curved in cross section, a cutter mounted on said spindle having intermediate of its length a bore provided with a wall concentric with the axis of the spindle and an annular wall lying opposite said shoulder in a plane parallel with the plane in which the face of the spindle shoulder lies, said concentric and annular walls of said cutter bore being connected by an annular bearing area curved in cross section to correspond with annular bearing area at the junction of the shoulder and reduced diameter spindle portions, balls rolling on said annular bearing surfaces, the joints between the spindle and the walls of the cutter bore being spaced away from the surface of the balls, and anti-friction means between the cutter and the spindle within the base of the cutter, and rotatively locking means within the cutter bore associated with the free end of the spindle.

7. A roller cutter of substantially frusto-conical form for earth boring drills, having a bore within its base portion, opening through the base face of the cutter, a smaller bore adjacent the bore first mentioned and defined by a wall concentric with the axis of the cutter and an annular front wall lying in a plane at right angles to the cutter axis connected with said concentric wall by an annular bearing surface concavely curved in cross section, a still smaller bore having a groove therein and a terminal bore of still smaller diameter within the apex portion of the cutter.

8. As an article of manufacture, a spindle support and a spindle for a rolling cutter, said article having a groove on the spindle adjacent the support, a reduced extension from a shoulder, a curved annular bearing area adjacent the shoulder, and means including a separately formed ring associated with the free end of the spindle and a flange thereon for rotatively locking a roller cutter on the spindle.

9. A cutter unit for a well drill including a spindle and support integral with each other, rolling bearings positioned on the spindle adjacent the support, a reduced portion of the spindle having a curved annular bearing surface adjacent a shoulder and ball bearings positioned thereon, a ring supported adjacent the free end of the spindle, means rotatively holding a roller cutter on the spindle bearing on said ring and a roller cutter enclosing the assembly and having frictional bearing on the spindle maintaining the cutter axially aligned for rotation on the rolling bearings and ball bearings.

10. A roller cutter unit for a well drill including a main spindle portion and a support therefor integral with each other, said spindle having a shoulder intermediate its length, a plurality of rolling bearing raceways spaced apart on the said main spindle portion one of said raceways being adapted to receive balls and located at the junction of the surface of said spindle and its shoulder, said raceway being partly on the spindle and partly on the shoulder and having a part concavely curved to conform to the curved surface of the ball, a ring supported adjacent the free end of said spindle, means within the apex portion of a roller cutter associated with said ring rotatively holding the roller cutter on said spindle, a supplemental spindle secured to the main spindle portion and engaging the said means and an approximately frusto-conical cutter shell enclosing bearings, spindle, ring, and means therein.

11. A roller cutter unit for a well drill including a roller cutter, a spindle portion integral with a support, rolling bearings on said spindle portion, a ring supported at the free end of said portion, said ring having a part of a raceway thereon for rolling bearings and having also an annular friction bearing for the cutter, means within the apex portion of said roller cutter completing the part of a raceway on the ring, and rolling bearings mounted in said raceway holding the cutter rotatively on said spindle.

12. A roller cutter and spindle assembly for earth boring drills comprising a spindle and its support, said spindle having adjacent its support a raceway portion for anti-friction bearings, and having intermediate of its length a shoulder lying in a plane substantially at right angles to the spindle axis and with a reduced diameter cylindrical portion of said spindle projecting from said shoulder, the surface of said shoulder and the surface of said reduced diameter cylindrical portion of the spindle having between them an annular bearing surface curved in cross section to conform to the curved surface of ball bearings rolling on said bearing surface, a cutter mounted on said anti-friction bearings, and means associated with the end portion of the cutter bore and spindle rotatively locking said cutter on the spindle.

13. A roller cutter and spindle assembly for earth boring drills according to claim 12, said cutter having annular friction bearings of different diameters to contact with complementary bearings on the spindle, one at each side of said ball bearings.

14. A roller cutter and spindle assembly for earth boring drills according to claim 12, said assembly having clearance within the same so arranged that the ball bearings sustain end thrusts of the cutter towards the support.

15. A roller cutter assembly for earth boring drills comprising a roller cutter, a spindle mounting said roller cutter made up of a main section and a terminal section, the latter having a flange with a space between it and the main section, a ring of L-shape in cross section mounted in said space and providing a raceway between its annular flange and said flange of the terminal spindle section, rollers for rotatively locking the roller cutter on the spindle mounted in said raceway, and anti-friction bearings between the main section of the spindle and the roller cutter.

16. A roller cutter assembly for earth boring drills comprising a roller cutter, a spindle mounting said roller cutter made up of a main section and a terminal section, the latter having a flange, a ring of L-shape in cross section mounted adjacent the terminal spindle section and providing a raceway between its annular flange and said flange of the terminal spindle section, rollers for rotatively locking the roller cutter on the spindle mounted in said raceway, and anti-friction bearings between the main section of the spindle and the roller cutter.

CLARENCE E. REED.